(12) United States Patent
Soeno et al.

(10) Patent No.: US 7,403,355 B2
(45) Date of Patent: Jul. 22, 2008

(54) INFORMATION RECORDING MEDIUM, RECORDING/REPRODUCING APPARATUS, AND STAMPER

(75) Inventors: Yoshikazu Soeno, Tokyo (JP); Takahiro Suwa, Tokyo (JP)

(73) Assignee: TDK Corporation, Tokyo (JP)

( * ) Notice: Subject to any disclaimer, the term of this patent is extended or adjusted under 35 U.S.C. 154(b) by 525 days.

(21) Appl. No.: 11/214,813

(22) Filed: Aug. 31, 2005

(65) Prior Publication Data

US 2006/0062135 A1 Mar. 23, 2006

(30) Foreign Application Priority Data

Sep. 1, 2004 (JP) .............................. 2004-253745
May 16, 2005 (JP) .............................. 2005-142072

(51) Int. Cl.
G11B 5/82 (2006.01)
G11B 5/84 (2006.01)
(52) U.S. Cl. .................. 360/135; 360/77.08; 360/77.05
(58) Field of Classification Search .............. 360/77.08, 360/135, 77.05
See application file for complete search history.

(56) References Cited

U.S. PATENT DOCUMENTS

| | | | |
|---|---|---|---|
| 6,014,296 A | | 1/2000 | Ichihara et al. |
| 6,051,299 A | * | 4/2000 | Uchiyama et al. ........ 428/848.5 |
| 6,055,139 A | * | 4/2000 | Ohtsuka et al. ............. 360/131 |
| 6,088,200 A | * | 7/2000 | Morita ....................... 360/135 |
| 6,563,673 B2 | * | 5/2003 | Mundt et al. ................. 360/135 |
| 2002/0051315 A1 | * | 5/2002 | Mundt et al. ................. 360/135 |
| 2005/0045583 A1 | | 3/2005 | Fujita et al. |
| 2005/0117253 A1 | | 6/2005 | Moriya et al. |
| 2006/0193083 A1 | * | 8/2006 | Soeno et al. ................. 360/135 |
| 2006/0203386 A1 | * | 9/2006 | Soeno et al. ................. 360/135 |

FOREIGN PATENT DOCUMENTS

| | | |
|---|---|---|
| JP | 9-97419 | 4/1997 |
| JP | 2000-20945 | 1/2000 |

OTHER PUBLICATIONS

English Language Abstract of JP 9-97419, Apr. 8, 2007.
English Language Abstract of JP 2000-20945, Jan. 21, 2000.
U.S. Appl. No. 11/085,522 to Takai et al., filed Mar. 22, 2005.
U.S. Appl. No. 11/214,827 to Soeno et al., filed Aug. 31, 2005.
U.S. Appl. No. 11/225,185 to Moriya et al., filed Sep. 14, 2005.
U.S. Appl. No. 11/229,650 to Soeno et al., filed Sep. 20, 2005.

* cited by examiner

Primary Examiner—William J Klimowicz
(74) Attorney, Agent, or Firm—Greenblum & Bernstein, P.L.C.

(57) ABSTRACT

On an information recording medium, a data track pattern and a servo pattern composed of a concave/convex pattern including a plurality of convex parts are formed on at least one surface of a substrate and respective concave parts in the concave/convex pattern are filled with non-magnetic material. In the concave/convex pattern that constructs the servo pattern, a unit convex part length along a direction of rotation of the substrate and a unit concave part length along the direction of rotation are set so that the ratio of the unit convex part length to the unit concave part length decreases from an inner periphery to an outer periphery of the information recording medium.

6 Claims, 10 Drawing Sheets

FIG. 21 RELATED ART und STAMPER

BACKGROUND OF THE INVENTION

1. Field of the Invention

The present invention relates to an information recording medium where a data track pattern and a servo pattern are formed by a concave/convex pattern and respective concave parts in the concave/convex pattern are filled with non-magnetic material, a recording/reproducing apparatus equipped with such information recording medium, and a stamper for manufacturing such information recording medium.

2. Description of the Related Art

As one example of a recording/reproducing apparatus equipped with this kind of information recording medium, a magnetic recording apparatus equipped with a discrete track-type magnetic disk is disclosed by Japanese Laid-Open Patent Publication No. H09-97419. The magnetic disk is produced by forming concentric recording tracks ("belt-like convex parts") composed of a recording magnetic material ("magnetic material") on one surface of a glass disk substrate ("substrate"). Guard band parts are also formed by filling spaces (concave parts) between the respective recording tracks with a guard band material (a non-magnetic material) to make the magnetic disk smoother and to magnetically separate adjacent recording tracks. When manufacturing such magnetic disks, first a magnetic material is sputtered onto one surface of the substrate to form the recording magnetic layer. Next, after a positive-type resist has been spin-coated so as to cover the recording magnetic layer and prebaked, the same pattern as the guard band parts is drawn using a matrix cutting apparatus and then developed. By doing so, a resist pattern is formed on the recording magnetic layer. After this, the recording magnetic layer is etched using the resist pattern as a mask and mask residual is then removed by an ashing apparatus. By doing so, recording tracks and a servo pattern (convex parts) composed of magnetic material are formed on the substrate. After this, a non-magnetic material is sputtered onto the substrate in this state. When doing so, a sufficient amount of non-magnetic material is sputtered until the respective concave parts between the recording tracks are completely filled with the non-magnetic material and the respective recording tracks are covered with the non-magnetic material. Next, the surface of the sputtered non-magnetic material is dry-etched to expose the upper surfaces of the recording tracks from the non-magnetic material. By doing so, recording tracks and guard band parts become adjacent in an alternating manner, thereby completing the magnetic disk.

SUMMARY OF THE INVENTION

By investigating the conventional magnetic disk described above, the present inventors discovered the following problem. With the conventional magnetic disk, after the non-magnetic material is sputtered so as to cover the recording magnetic layer (the recording tracks), the non-magnetic material is dry-etched until the upper surfaces of the convex parts such as the recording tracks and the servo pattern are exposed, thereby smoothing the surface. However, when a magnetic disk is manufactured according to this method of manufacturing, there are cases where a large amount of non-magnetic material remains on the convex parts formed of the magnetic material (hereinafter, non-magnetic material remaining on the convex parts is also referred to as "residual") in an outer periphery of the magnetic disk, resulting in the convex parts being thickly covered with the non-magnetic material.

Figure 17:
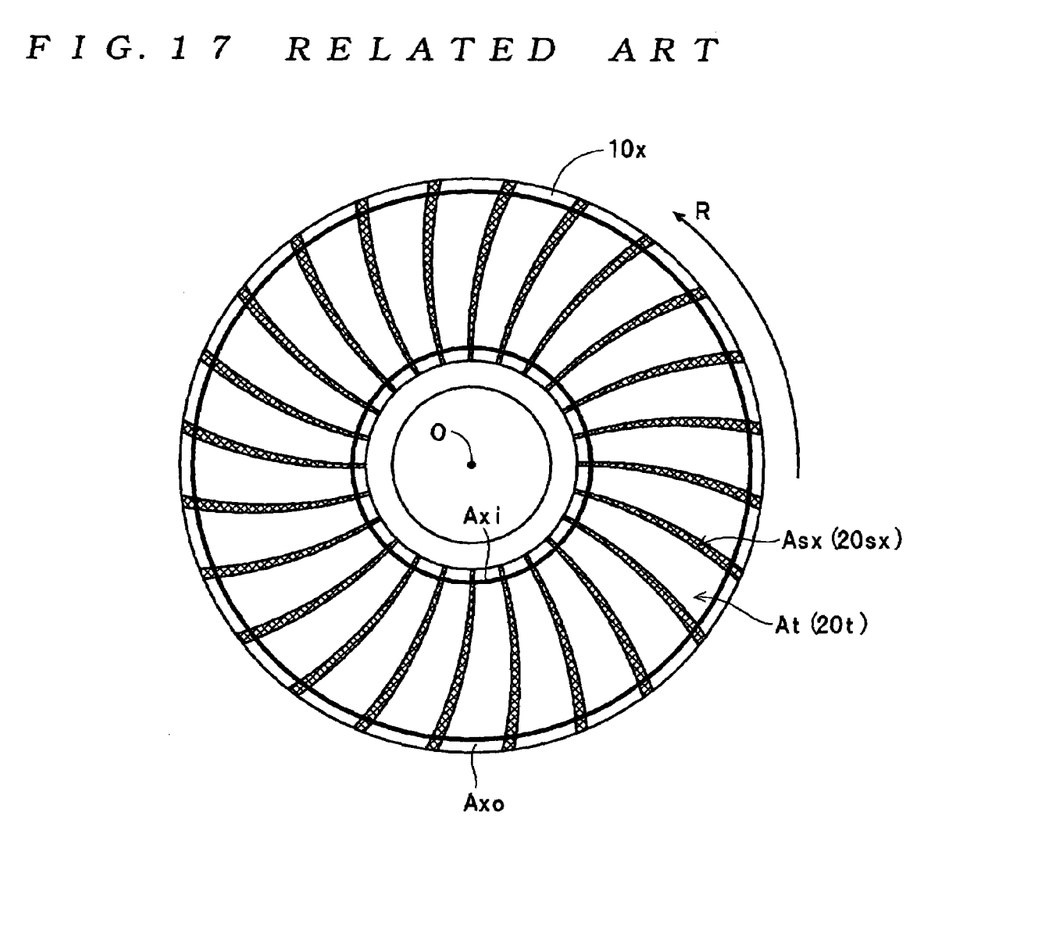
FIG. 17 is a plan view of a conventional magnetic disk.
Figure 18:
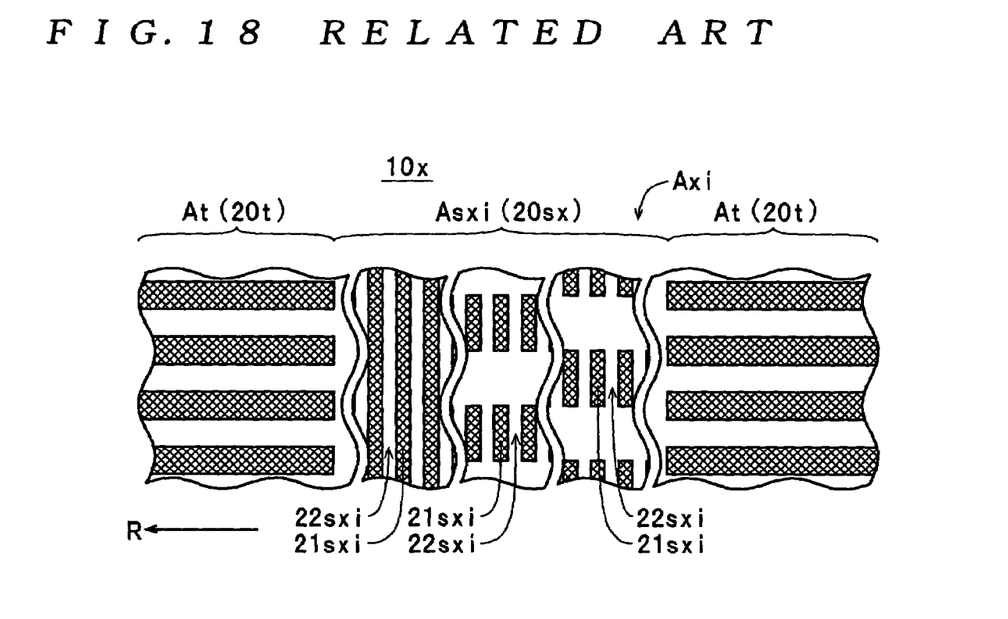
FIG. 18 is a plan view of an inner periphery region of the conventional magnetic disk.

As a specific example, as shown in FIG. 17, a magnetic disk $10x$ manufactured according to a method of manufacturing described above is manufactured so that track pattern regions At, in each of which a concave/convex pattern $20t$ composed of a plurality of concentric recording tracks is formed, and servo pattern regions Asx, in which a concave/convex pattern $20sx$ for tracking servo purposes is formed, alternate in the direction of rotation (the direction of the arrow R in FIG. 17) of the magnetic disk $10x$. In a recording/reproducing apparatus in which this type of magnetic disk is provided, the magnetic disk is normally rotated at a fixed angular velocity during recording and reproducing. Accordingly, on the magnetic disk $10x$, the length of the servo pattern region Asx along the direction of rotation of the magnetic disk $10x$ is set so as to become longer from the inner periphery of the magnetic disk $10x$ to the outer periphery (i.e., the servo pattern region Asx widens toward the outer periphery of the magnetic disk $10x$) in proportion to the length on the magnetic disk $10x$ that passes below a magnetic head (not shown) per unit time. More specifically, as shown in FIGS. 18 and 20, the length of an outer periphery servo pattern region Asxo in an outer periphery region Axo is greater than the length of an inner periphery servo pattern region Asxi in an inner periphery region Axi in proportion to a distance from a center O (see FIG. 17) of the concave/convex pattern $20t$. Also, on this type of magnetic disk, at positions an equal distance from the center O, the unit length of convex parts (a reference length for which one convex part is detected when reading a magnetic signal: L1xi, L1xo in FIGS. 19 and 21) in the direction of rotation for convex parts $21sxi$, $21sxo$ (hereinafter simply referred to as "convex parts $21sx$" when no distinction is required) of the servo pattern region Asx (the concave/convex pattern $20sx$) is set equal to the unit length of concave parts (a reference length for which one concave part is detected when reading the magnetic signal: L2xi, L2xo in FIGS. 19 and 21) along the direction of rotation for concave parts $22sxi$, $22sxo$ (hereinafter simply referred to as "concave parts $22sx$" when no distinction is required). As a result, on the magnetic disk $10x$, the ratio of the unit convex part length to the unit concave part length is 1 across the entire range from the inner periphery to the outer periphery.

Figure 19:
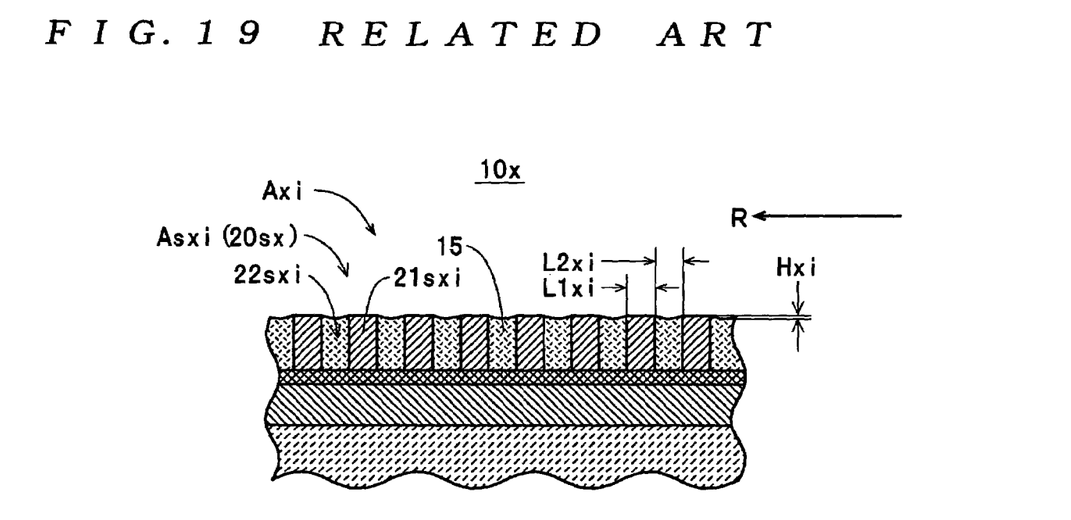
FIG. 19 is a cross-sectional view of an inner periphery servo pattern region in the inner periphery region of the conventional magnetic disk.
Figure 20:
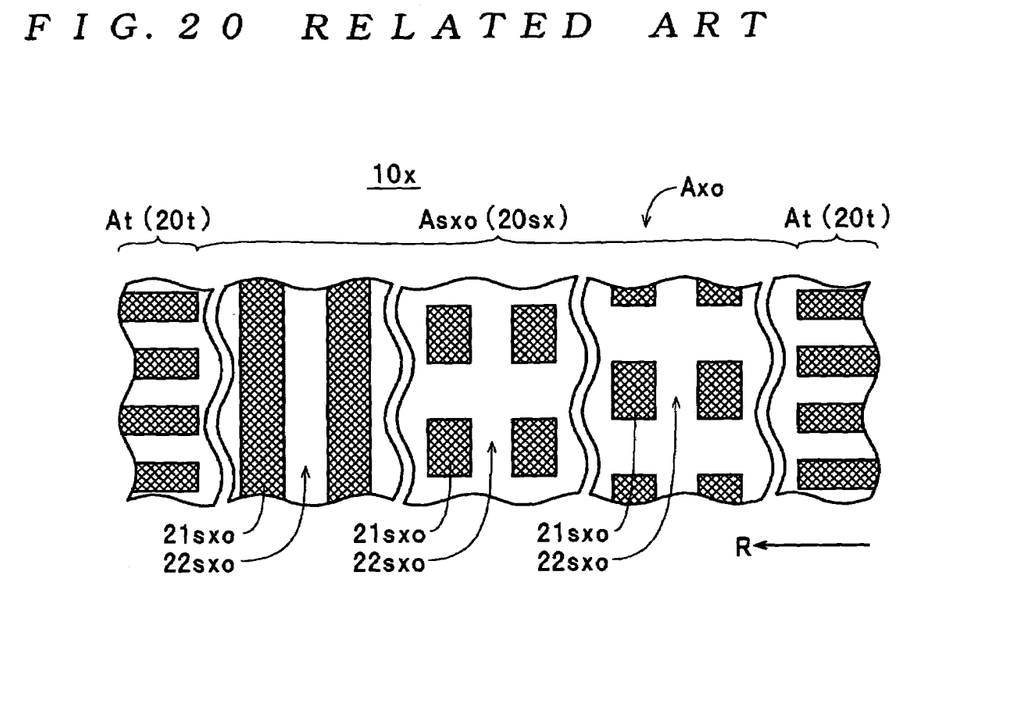
FIG. 20 is a plan view of an outer periphery region of the conventional magnetic disk.
Figure 21:
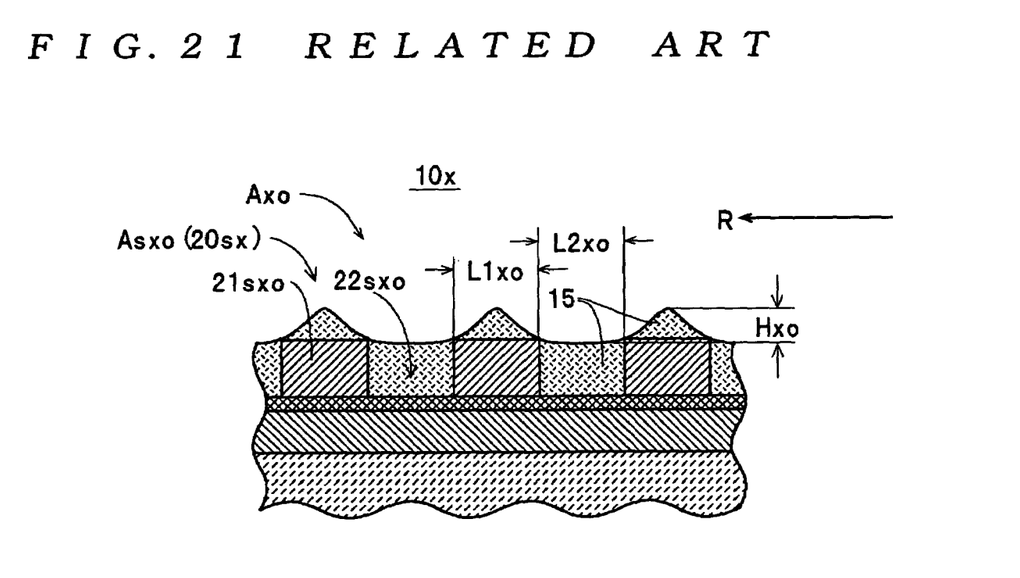
FIG. 21 is a cross-sectional view of an outer periphery servo pattern region in the outer periphery region of the conventional magnetic disk.

Accordingly, as shown in FIGS. 19 and 21, on this magnetic disk $10x$, the length L1xo of the convex parts $21sxo$ in the outer periphery servo pattern region Asxo is longer than the length L1xi of the convex parts $21sxi$ in the inner periphery servo pattern region Asxi in proportion to the distance from the center O of the concave/convex pattern $20t$. The applicant has discovered a phenomenon whereby during the dry-etching of the non-magnetic material 15 to expose the respective convex parts $21sx$, the greater the length of the convex parts $21sx$ present below the non-magnetic material 15 (i.e., the greater the width of the upper surfaces of the convex parts $21sx$), the slower the etching of the non-magnetic material 15 proceeds. For this reason, as shown in FIG. 19, when etching is carried out for the entire region of the magnetic disk $10x$ from the inner periphery to the outer periphery with etching conditions set so that in the inner periphery servo pattern region Asxi where the length L1xi is comparatively short, the residual (the non-magnetic material 15) on the convex parts $21sxi$ is removed and the inner periphery of the magnetic disk $10x$ has favorable smoothness (the value of the surface roughness Ra is low, or the height difference Hxi between the convexes and the concaves is small), as shown in FIG. 21, comparatively thick residual (the non-magnetic material 15) is left on the convex parts 21sxo in the outer periphery servo pattern region Asxo whose length L1xo is comparatively long. Accordingly, when the non-magnetic material 15 is etched with such etching conditions, the surface roughness Ra (or the height difference Hxo between the convexes and concaves) in the outer periphery of the magnetic disk 10x becomes extremely large. In this way, for the conventional magnetic disk 10x, there has been the problem that due to the convex parts 21sxo being thickly covered with the non-magnetic material 15 in the outer periphery, the smoothness of the magnetic disk 10x deteriorates remarkably in the outer periphery (i.e., as the distance from the center O increases).

Also, for the conventional magnetic disk, during the manufacturing process, a resist pattern is formed by using a matrix cutting apparatus to draw an exposure pattern in a positive-type resist formed so as to cover the recording magnetic layer and then developing the resist. When doing so, since time is required to draw the exposure pattern, it is difficult to quickly form the resist pattern (mask) for etching the recording magnetic layer. A faster method of producing the resist pattern is therefore desired.

The present invention was conceived to solve the problem described above and it is a principal object of the present invention to provide an information recording medium with favorable smoothness across an entire range from an inner periphery to an outer periphery thereof, a recording/reproducing apparatus equipped with an information recording medium with favorable smoothness, and a stamper that can easily form a concave/convex pattern for use during etching in a short time.

On an information recording medium according to the present invention, a data track pattern and a servo pattern composed of a concave/convex pattern including a plurality of convex parts are formed on at least one surface of a substrate and respective concave parts in the concave/convex pattern are filled with non-magnetic material, wherein in the concave/convex pattern that constructs the servo pattern, a unit convex part length along a direction of rotation of the substrate and a unit concave part length along the direction of rotation are set so that the ratio of the unit convex part length to the unit concave part length decreases from an inner periphery to an outer periphery of the information recording medium. A recording/reproducing apparatus according to the present invention includes the information recording medium described above and a control unit that carries out servo control based on servo data corresponding to the servo pattern.

It should be noted that the expression "unit concave part length" in this specification refers to a reference length for detecting that "one concave part is present" when reading a magnetic signal from an information recording medium. Also, the expression "unit convex part length" in this specification refers to a reference length for detecting that "one convex part is present" when reading a magnetic signal from an information recording medium. Accordingly, on an actual information recording medium, in accordance with the content of the servo data, the servo pattern is composed of convex parts of lengths that are integer multiples of the unit convex part length and concave parts of lengths that are integer multiples of the unit concave part length. Here, the reference length for detecting that "one concave part is present" may be set at a common length for the entire servo pattern or may be set at different lengths for the different types of pattern (preamble pattern, address pattern, burst pattern, and the like) that construct the servo pattern. In the same way, the reference length for detecting that "one convex part is present" may be set at a common length for the entire servo pattern or may be set at different lengths for the different types of servo pattern. In addition, normally the formation position of a convex part is detected as "output present for a detection signal" or "a high signal level for a detection signal" and the formation position of a concave part is detected as "no output for a detection signal" or "a low signal level for a detection signal".

According to the above information recording medium and the recording/reproducing apparatus, by forming the concave/convex pattern that constructs the servo pattern by setting the unit convex part length and the unit concave part length so that the ratio of the unit convex part length to the unit concave part length decreases from the inner periphery to the outer periphery, compared to a conventional information recording medium (the magnetic disk 10x) where a concave/convex pattern is formed so that the ratio of the unit convex part length to the unit concave part length is equal across the entire range from the inner periphery to the outer periphery, it is possible to sufficiently reduce the unit convex part length in the outer periphery. Accordingly, when etching a layer of non-magnetic material formed so as to cover the respective convex parts, it is possible to avoid a situation where there is a large difference between the thickness of the residual on the respective convex parts in the outer periphery and the thickness of the residual on the respective convex parts in the inner periphery. Also, when the non-magnetic material is etched so that there is no non-magnetic material (residual) on the respective convex parts across the entire range from the inner periphery to the outer periphery, it is possible to remove the residual on the respective convex parts without causing a situation where in the inner periphery, the convex parts (the magnetic material) themselves are etched together with the non-magnetic material. By doing so, it is possible to maintain favorable smoothness for the information recording medium across the entire range from the inner periphery to the outer periphery. For this reason, the flying height of a magnetic head above the information recording medium can be kept equal across the entire range from the inner periphery to the outer periphery of the information recording medium, and therefore stable recording and reproducing can be carried out by a recording/reproducing apparatus equipped with this information recording medium.

For the information recording medium according to the present invention, in the concave/convex pattern that constructs the servo pattern, the unit concave part length may be set so as to increase from the inner periphery to the outer periphery. A recording/reproducing apparatus according to the present invention includes the information recording medium described above and a control unit that carries out servo control based on servo data corresponding to the servo pattern.

According to the information recording medium and the recording/reproducing apparatus, by forming the concave/convex pattern that constructs the servo pattern by setting the unit concave part length so as to increase from the inner periphery to the outer periphery, unlike for example a structure where the unit concave part length is the same length across the entire range from the inner periphery to the outer periphery and the ratio of the unit convex part length to the unit concave part length decreases from the inner periphery to the outer periphery by changing the unit convex part length, it is possible to avoid a situation where the unit convex part length in the outer periphery is excessively short. Accordingly, it is possible to reliably avoid the occurrence of read errors for a magnetic signal read from the convex parts in the outer periphery.

For the information recording medium according to the present invention, in the concave/convex pattern that constructs the servo pattern, the unit convex part length may be set at an equal or substantially equal length in an entire range from the inner periphery to the outer periphery. A recording/reproducing apparatus according to the present invention includes the information recording medium described above and a control unit that carries out servo control based on servo data corresponding to the servo pattern.

It should be noted that for the present invention, even if extremely small manufacturing errors occur and there are slight fluctuations in the unit convex part length in the concave/convex pattern, such lengths are still included within the concept of "an equal length" (lengths in a predetermined range centered on a predetermined length that is the target for manufacturing). The expression "a substantially equal length" includes lengths in a tolerated range of a narrow width set in advance, the range being centered on a predetermined length that is the target for manufacturing and not relating to manufacturing errors.

According to the information recording medium and the recording/reproducing apparatus, by forming the concave/convex pattern by setting the unit convex part length at an equal or substantially equal length across an entire range from the inner periphery to the outer periphery, it is possible to keep the thickness of the residual (the non-magnetic material) formed on the respective convex parts uniform across the entire range from the inner periphery to the outer periphery. Also, when the non-magnetic material is etched so as to not leave residual on the respective convex parts in the inner periphery, it is possible to avoid the situation where the convex parts in the outer periphery are etched and the situation where residual is left on the convex parts in the outer periphery, and when the non-magnetic material is etched so as to not leave residual on the respective convex parts in the outer periphery, it is possible to avoid the situation where the convex parts in the inner periphery are etched and the situation where residual is left on the convex parts in the inner periphery. Accordingly, it is possible to keep the smoothness of the information recording medium uniform across the entire range from the inner periphery to the outer periphery. As a result, the flying height of a magnetic head above the information recording medium can be kept uniform across the entire range from the inner periphery to the outer periphery.

For the information recording medium according to the present invention, respective convex parts in the concave/convex pattern that constructs the data track pattern may be formed concentrically or in a spiral, and in the concave/convex pattern that constructs the servo pattern, the combined length of the unit convex part length and the unit concave part length may be set so as to increase from the inner periphery to the outer periphery in proportion to a distance from a center of the data track pattern. A recording/reproducing apparatus according to the present invention includes the information recording medium described above and a control unit that carries out servo control based on servo data corresponding to the servo pattern.

It should be noted that the expression "the respective convex parts in the concave/convex pattern that constructs the data track pattern may be formed concentrically or in a spiral" in this specification includes a data track pattern of a patterned medium where convex parts as unit recording elements that are separated in both the radial direction and the direction of rotation of the information recording medium by concave parts in the concave/convex pattern are disposed concentrically or in a spiral. In addition, for the present invention, even if extremely small manufacturing errors occur and the combined length of the unit convex part length and the unit concave part length is a slightly different length to a length that increases from the inner periphery to the outer periphery in proportion to a distance from a center of the data track pattern, such combined length of the unit convex part length and the unit concave part length in the concave/convex pattern is still included in the concept of a length that increases in proportion to a distance from the center.

According to the information recording medium and the recording/reproducing apparatus, by forming the concave/convex pattern that constructs the servo pattern by setting the combined length of the unit convex part length and the unit concave part length so as to increase from the inner periphery to the outer periphery in proportion to the distance from the center of the data track pattern, the servo data can be reliably read (detected) from the servo pattern region in the inner periphery and the servo pattern region in the outer periphery without changing the frequency of the clock used as a reference for reading the servo data from the servo pattern region. Since it is possible to carry out servo control with the same processing circuit as a servo signal processing circuit in an extremely common existing recording/reproducing apparatus, it is possible to reliably avoid increases in the manufacturing cost of a recording/reproducing apparatus.

On a stamper according to the present invention, a concave/convex pattern is formed including convex parts formed corresponding to concave parts in the concave/convex pattern of any of the information recording media described above and concave parts formed corresponding to convex parts in the concave/convex pattern of the information recording media.

According to the above stamper, by forming the concave/convex pattern with convex parts formed corresponding to the concave parts in the concave/convex pattern of any of the information recording media described above and concave parts formed corresponding to the convex parts in the concave/convex pattern of such information recording medium, unlike for example a method of manufacturing that forms the concave/convex pattern for use during etching (a concave/convex pattern used as a mask when etching to form the servo pattern and the like) by using an electron beam lithography apparatus to draw an exposure pattern in a resin layer of a preform for manufacturing an information recording medium and then developing the exposure pattern, it is possible to easily and quickly form the concave/convex pattern for use during etching by merely pressing the concave/convex pattern of the stamper into the resin layer. It is also possible to form the concave/convex pattern for use during etching in a large number of preforms using a single stamper. Accordingly, the manufacturing cost of the information recording medium can be sufficiently reduced.

It should be noted that the disclosure of the present invention relates to a content of Japanese Patent Application 2004-253745 that was filed on 1 Sep. 2004 and of Japanese Patent Application 2005-142072 that was filed on 16 May 2005, the entire content of which is herein incorporated by reference.

BRIEF DESCRIPTION OF THE DRAWINGS

These and other objects and features of the present invention will be explained in more detail below with reference to the attached drawings, wherein.

DESCRIPTION OF THE PREFERRED EMBODIMENTS

Preferred embodiments of an information recording medium, a recording/reproducing apparatus, and a stamper according to the present invention will now be described with reference to the attached drawings.

Figure 1:
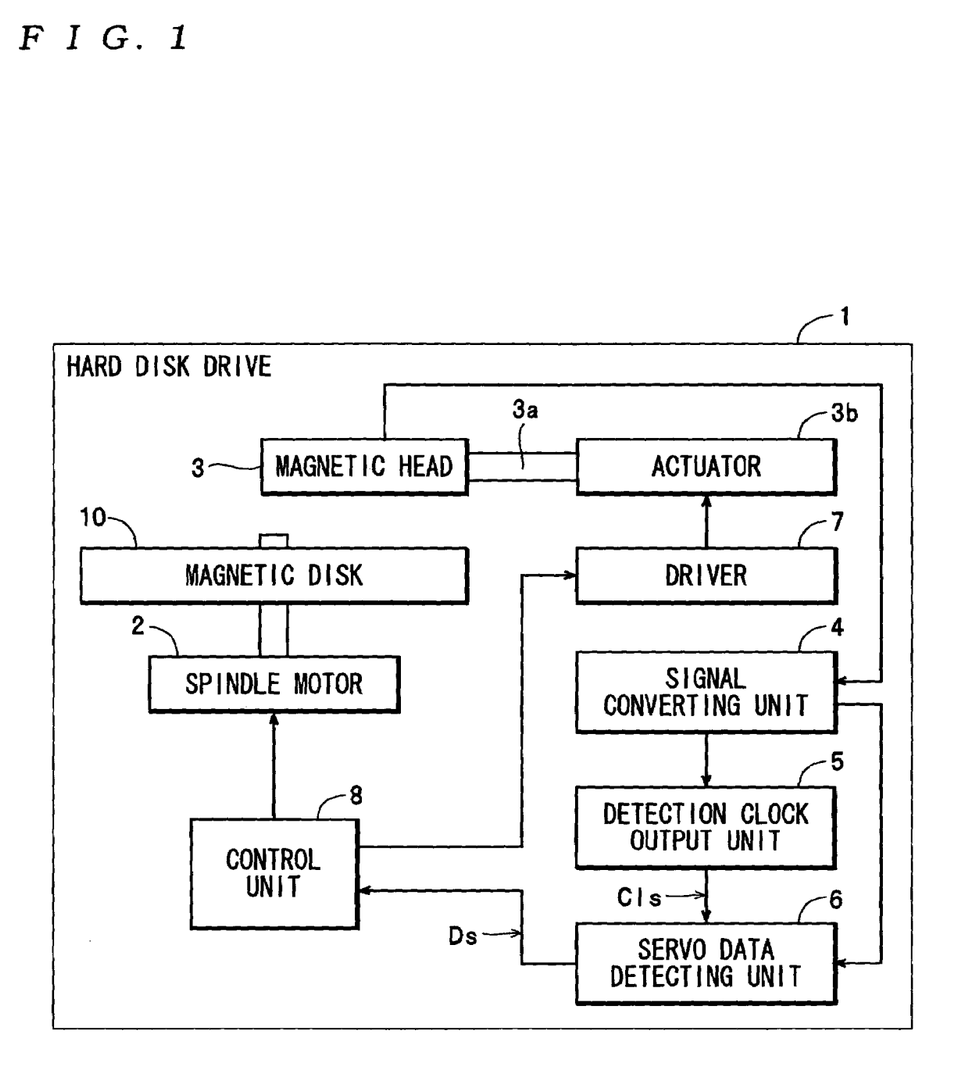
FIG. 1 is a block diagram showing the construction of a hard disk drive.
Figure 2:
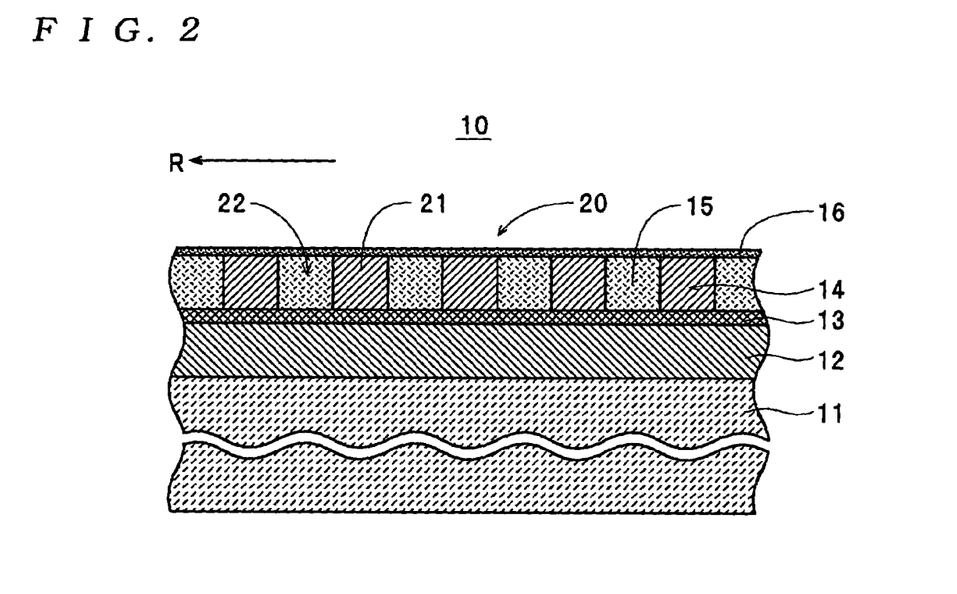
FIG. 2 is a cross-sectional view showing the multilayer structure of a magnetic disk.

A hard disk drive 1 shown in FIG. 1 is a magnetic recording/reproducing apparatus as one example of a recording/reproducing apparatus according to the present invention and includes a spindle motor 2, a magnetic head 3, a signal converting unit 4, a detection clock output unit 5, a servo data detecting unit 6, a driver 7, a control unit 8, and a magnetic disk 10. Here, as one example, the magnetic disk 10 is a discrete track-type magnetic disk (patterned medium) on which recording data can be recorded by perpendicular recording, and corresponds to the information recording medium according to the present invention. More specifically, as shown in FIG. 2, the magnetic disk 10 is constructed so that a soft magnetic layer 12, an intermediate layer 13, and a magnetic layer 14 are formed in that order on a glass substrate 11. Here, the magnetic layer 14 formed on the intermediate layer 13 constructs a predetermined concave/convex pattern 20 by having convex parts 21 formed of a magnetic material and concave parts 22 alternately formed. The concave parts 22 are filled with a non-magnetic material 15 such as $SiO_2$. In addition, a thin film of diamond-like carbon (DLC), as one example, is formed by chemical vapor deposition (CVD) to produce a protective layer (DLC layer) 16 with a thickness of around 2 nm on the non-magnetic material 15 that fills the concave parts 22 and on the convex parts 21. A lubricant (as one example, a fluoride lubricant) is also applied onto the surface of the protective layer 16 of the magnetic disk 10.

The glass substrate 11 corresponds to a "substrate" for the present invention and is formed with a thickness of around 0.6 mm by polishing the surface of a glass plate with a diameter of 2.5 inches until the surface roughness Ra is around 0.2 to 0.3 nm. It should be noted that the substrate for the present invention is not limited to a substrate of a glass material and it is possible to form the substrate of various types of non-magnetic material such as aluminum and ceramics. The soft magnetic layer 12 is formed with a thickness of around 100 nm to 200 nm by sputtering a soft magnetic material such as CoZrNb alloy. The intermediate layer 13 functions as an underlayer for forming the magnetic layer 14 and is formed with a thickness of around 40 nm by sputtering an intermediate layer forming material such as Cr or a non-magnetic CoCr alloy. The magnetic layer 14 is a layer composed of the convex parts 21 formed of the magnetic material. As described later, the convex parts 21 (the concave/convex pattern 20) are formed by carrying out a process that sputters a CoCrPt alloy, for example, and a process that forms the concave parts 22 by etching using a resist pattern or the like as a mask in that order.

Figure 3:
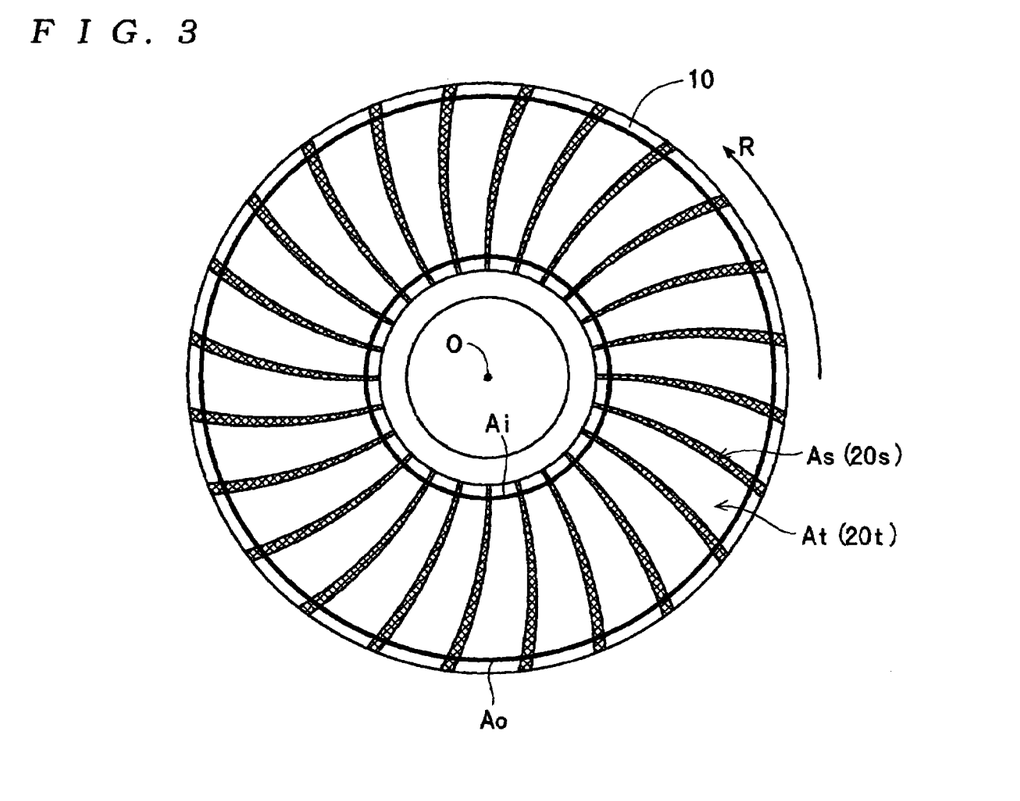
FIG. 3 is a plan view of the magnetic disk.
Figure 4:
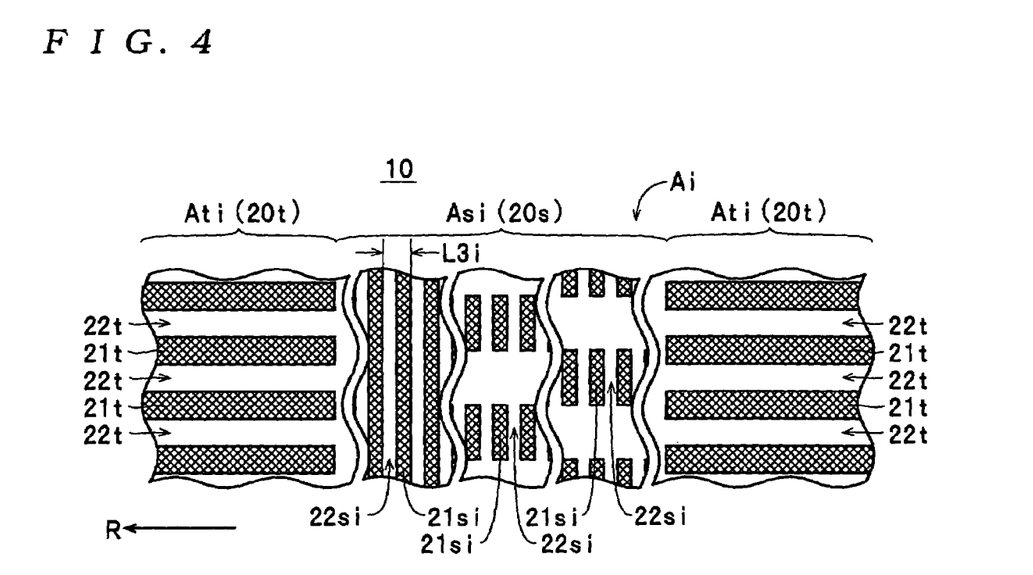
FIG. 4 is a plan view of an inner periphery region of the magnetic disk.
Figure 6:
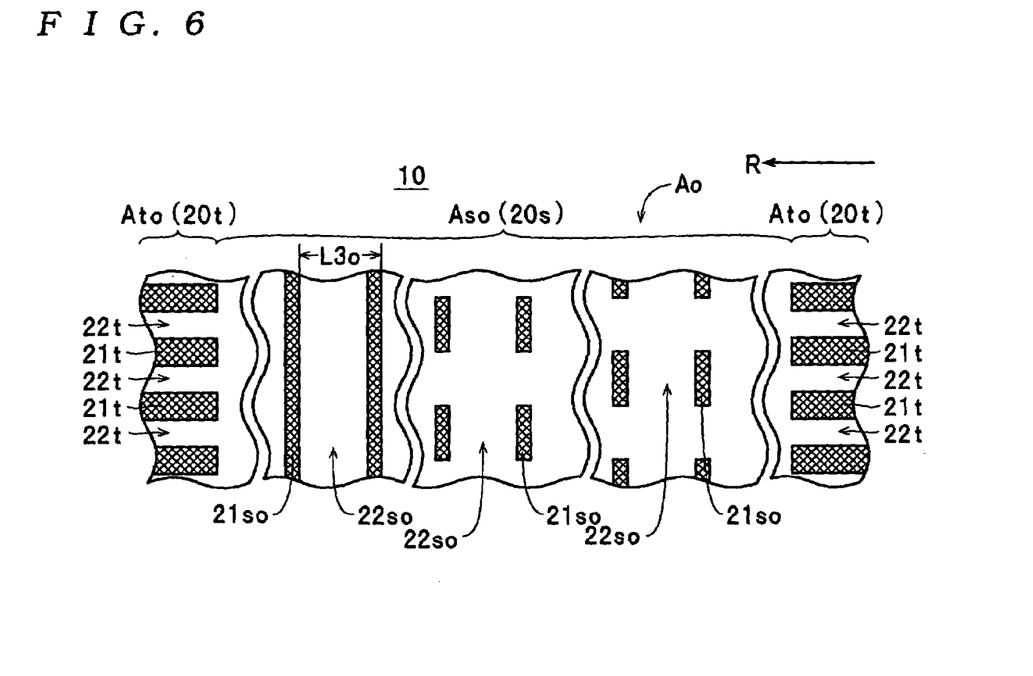
FIG. 6 is a plan view of an outer periphery region of the magnetic disk.

In this case, as shown in FIG. 3, on the magnetic disk 10, servo pattern regions As are provided between track regions At, with the track regions At and the servo pattern regions As being alternately disposed in the direction of rotation (the direction of the arrow R) of the magnetic disk 10. Also, as shown in FIGS. 4 and 6, a concave/convex pattern 20t is formed as a data track pattern in the track pattern region At (an inner periphery track pattern region Ati and an outer periphery track pattern region Ato). Here, the concave/convex pattern 20t is composed of a plurality of concentric convex parts 21t (data recording tracks: also referred to hereinafter as "recording tracks") whose center O (see FIG. 3) is the center of rotation of the magnetic disk 10 and concave parts 22t present between the respective convex parts 21t. It should be noted that although it is preferable for the center O of the concave/convex pattern 20t to match the center of rotation of the magnetic disk 10, in reality, there are cases where an extremely small displacement of around 30 to 50 μm is produced due to manufacturing error. However, since tracking servo control can still be performed sufficiently for the magnetic head 3 when a displacement of such magnitude is present, the center of rotation and the center O can be thought of as effectively matching. Also, the concave parts 22t of the concave/convex pattern 20t are filled with the non-magnetic material 15 to make the surface of the track pattern region At smooth.

Also, as shown by FIGS. 4 to 7, a concave/convex pattern 20s is formed as a servo pattern in the servo pattern region As (an inner periphery servo pattern region Asi and an outer periphery servo pattern region Aso). Here, the concave/convex pattern 20s is composed of convex parts 21s (convex parts 21si and convex parts 21so) that construct various types of servo patterns such as a preamble pattern, an address pattern, and a burst pattern, and concave parts 22s (concave parts 22si and concave parts 22so). In addition, on the magnetic disk 10, the combined length of the length of a convex part 21s and the length of a concave part 22s along the direction of rotation (the direction shown by the arrow R in the respective drawings), or in other words, the formation pitch of a convex part 21s and a concave part 22s, is set so as to gradually increase from the inner periphery of the magnetic disk 10 to the outer periphery in proportion to the distance from the center O of the concave/convex pattern 20t. In addition, on the magnetic disk 10, the respective convex parts 21s are formed so that the length of the convex parts 21s along the direction of rotation is equal across the entire range from the inner periphery of the magnetic disk 10 to the outer periphery (one example of a setting where "the unit convex part length is set at an equal or substantially equal length" for the present invention) and the respective concave parts 22s are formed so that the length of the concave parts 22s along the direction of rotation gradually increases from the inner periphery of the magnetic disk 10 to the outer periphery. Accordingly, on the magnetic disk 10, the ratio of the length of the convex parts 21s to the length of the concave parts 22s along the direction of rotation gradually decreases from the inner periphery to the outer periphery.

Figure 5:
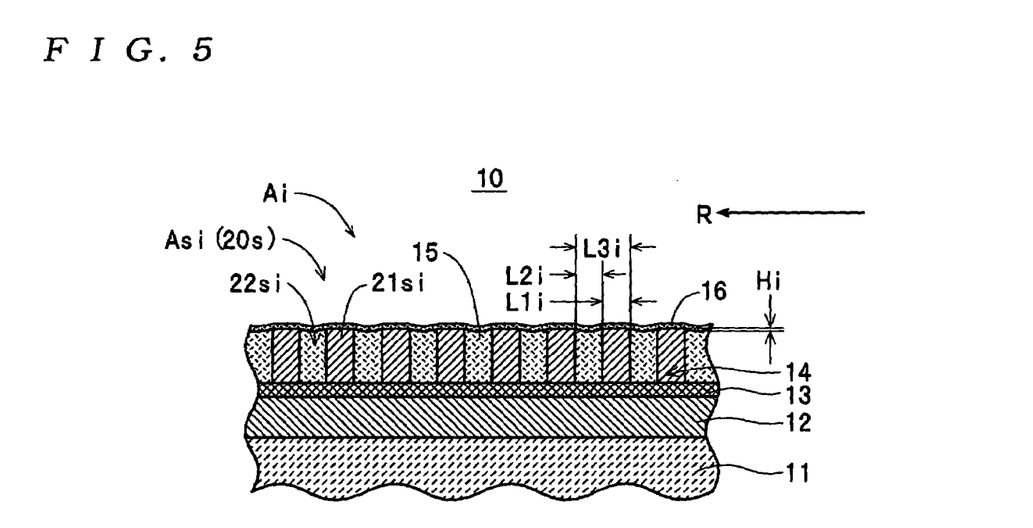
FIG. 5 is a cross-sectional view of an inner periphery servo pattern region in the inner periphery region.
Figure 7:
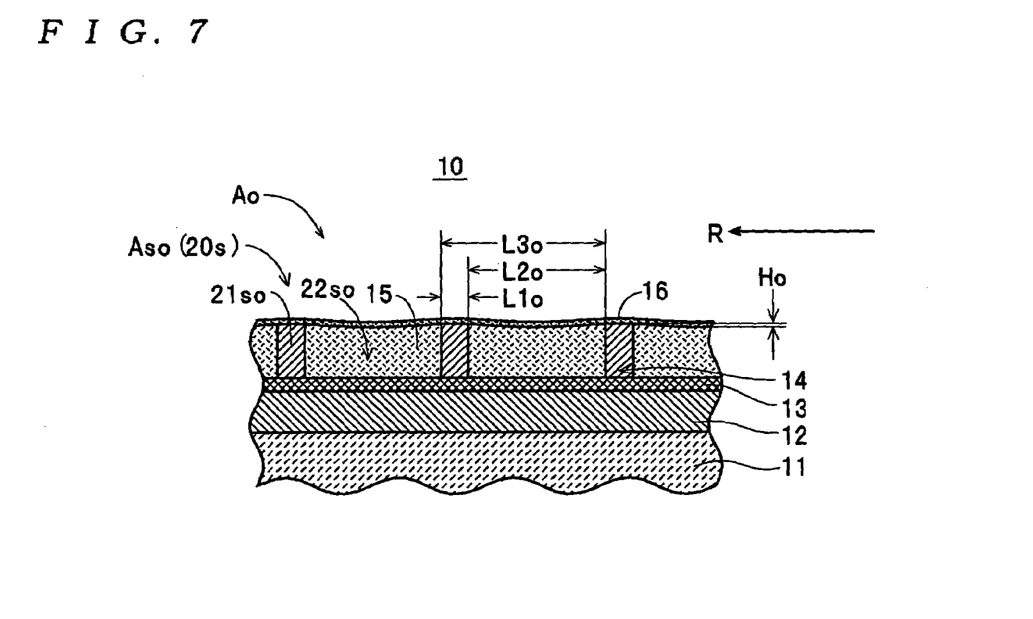
FIG. 7 is a cross-sectional view of an outer periphery servo pattern region in the outer periphery region.

More specifically, as shown in FIGS. 4 and 5, in an inner periphery region Ai (as one example, a preamble pattern formation region at a position 11 mm from the center O of the concave/convex pattern 20t), a length L3i that is the total of a length L2i of a concave part 22si (as one example, 220 nm) and a length L1i of a convex part 21si (as one example, 220 nm) is set at 440 nm. On the other hand, as shown in FIGS. 6 and 7, in an outer periphery region Ao (as one example, a preamble pattern formation region at a position 32 mm from the center O of the concave/convex pattern 20t), a length L3o that is the total of a length L2o of a concave part 22so (as one example, 1060 nm) and a length L1o of a convex part 21so (as one example, at 220 nm which is equal to the length L1i of the convex part 21si) is set at 1280 nm. In this way, on the magnetic disk 10, the combined length of the length of a convex part 21s and the length of a concave part 22s along the direction of rotation (the direction shown by the arrow R in the respective drawings), or in other words, the formation pitch of a convex part 21s and a concave part 22s, is set so as to gradually increase from the inner periphery of the magnetic disk 10 to the outer periphery. As a result, as shown in FIG. 5, on the magnetic disk 10, although the ratio of the length L1i of a convex part 21si to the length L2i of a concave part 22si in the concave/convex pattern 20s in the inner periphery region Ai is 1, as shown in FIG. 7, the ratio of the length L1o of a convex part 21so to the length L2o of a concave part 22so in the outer periphery region Ao is 11/53.

In this case, the ratio of the length of a convex part 21s (the unit convex part length) to the length of a concave part 22s (the unit concave part length) is set in the same way not only for the preamble pattern mentioned above but also for the concave/convex pattern 20s that constructs the address pattern and the burst pattern. Regarding the burst pattern, in a region where a plurality of oblong convex parts 21s are disposed in lines on both sides on the concave parts 22s along the direction of rotation of the magnetic disk 10, the ratio of the unit convex part length to the unit concave part length is set so that the above conditions are satisfied. It should be noted that in FIGS. 4 to 7, the preamble pattern and burst pattern in the servo pattern are schematically illustrated and for ease of understanding, the lengths of the respective convex parts 21s and the respective concave parts 22s along the direction of rotation are illustrated using the unit convex part length and unit concave part length of the servo pattern only. Accordingly, on actual magnetic disks 10, the number, formation positions, and lengths of the convex parts 21s and the concave parts 22s differ to the states shown in the respective drawings, and the concave/convex pattern 20s is formed with the number, formation positions, and lengths of the convex parts 21s and the concave parts 22s corresponding to the various types of control data including information (patterns) such as track addresses and sector addresses required for tracking servo control. In this case, the actual lengths of the convex parts 21s and the concave parts 22s are integer multiples of the lengths of the convex parts 21s and the concave parts 22s (i.e., integer multiples of the unit convex part length and the unit concave part length).

The spindle motor 2 rotates the magnetic disk 10 at a fixed rotational speed, such as 4200 rpm, under the control of the control unit 8. As shown in FIG. 1, the magnetic head 3 is attached to an actuator 3b via a swing arm 3a and is moved above the magnetic disk 10 during the recording and reproducing of recording data on the magnetic disk 10. Also, the magnetic head 3 carries out reads of servo data from the servo pattern region As of the magnetic disk 10, magnetic writes of recording data in the track pattern region At (the convex parts 21t), and reads of recording data that has been magnetically written in the track pattern region At. It should be noted that although an actual magnetic head 3 is formed on a base surface (air bearing surface) of a slider that causes the magnetic head 3 to fly above the magnetic disk 10, the slider has been omitted from this specification and the drawings. The actuator 3b swings the swing arm 3a by a driving current supplied from the driver 7 under the control of the control unit 8 and thereby moves the magnetic head 3 to an arbitrary recording/reproducing position above the magnetic disk 10.

The signal converting unit 4 includes an amplifier, a low pass filter (LPF), an A/D converter, and the like (not shown), amplifies various signals obtained by the magnetic head 3 from the magnetic disk 10, removes noise, and then carries out an A/D conversion and outputs digital data. Out of the digital data outputted from the signal converting unit 4, the detection clock output unit 5 obtains (detects) preamble data (a signal) read via the magnetic head 3 from the servo pattern region As. In addition, based on the obtained data, the detection clock output unit 5 generates (detects) and outputs a detection clock signal Cls used as a reference clock when detecting servo data. The servo data detecting unit 6 reads in synchronization with the detection clock Cls outputted from the detection clock output unit 5 to obtain (detect) servo data Ds from the digital data outputted from the signal converting unit 4 and outputs the servo data Ds to the control unit 8. The driver 7 controls the actuator 3b in accordance with a control signal from the control unit 8 so that the magnetic head 3 is kept aligned with a desired recording track (the convex parts 21t). The control unit 8 carries out overall control of the hard disk drive 1. The control unit 8 also controls the driver 7 based on the servo data Ds outputted from the servo data detecting unit 6.

Next, the method of manufacturing the magnetic disk 10 will be described with reference to the drawings.

Figure 8:
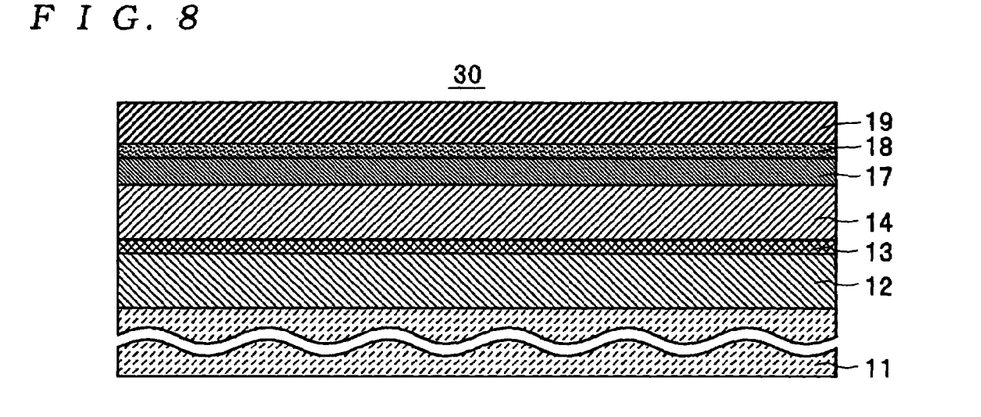
FIG. 8 is a cross-sectional view of a preform for manufacturing the magnetic disk.
Figure 9:
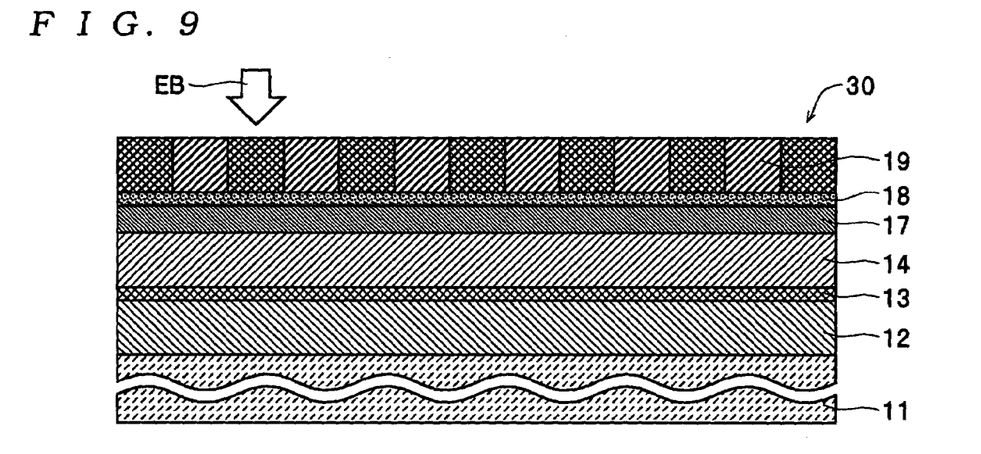
FIG. 9 is a cross-sectional view of the preform in a state where an exposure pattern has been drawn on a resin layer by irradiation with an electron beam.
Figure 10:
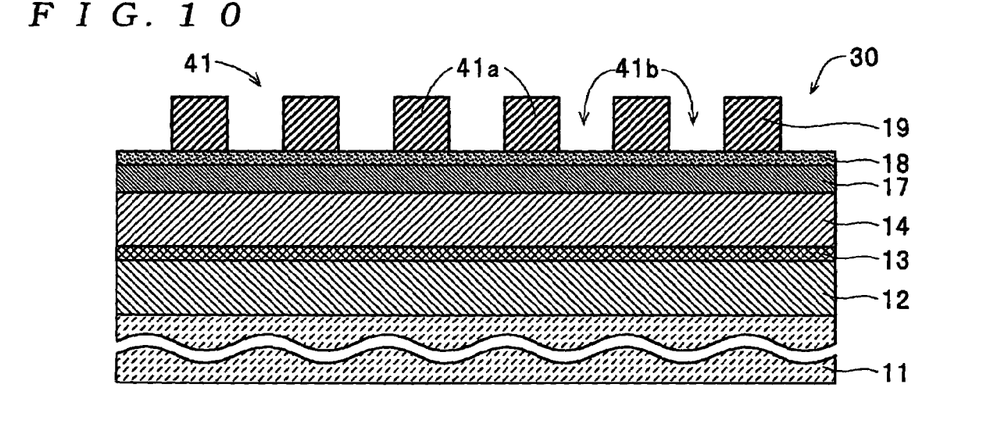
FIG. 10 is a cross-sectional view of the preform where the resin layer in the state shown in FIG. 9 has been developed or where a concave/convex pattern of a stamper has been transferred to the resin layer.

First, after the soft magnetic layer 12 has been formed by sputtering CoZrNb alloy on the glass substrate 11, the intermediate layer 13 is formed by sputtering an intermediate layer forming material on the soft magnetic layer 12. Next, by sputtering CoCrPt alloy on the intermediate layer 13, the magnetic layer 14 is formed with a thickness of around 15 nm. After this, a C (carbon) mask layer 17 is formed on the magnetic layer 14 with a thickness of around 12 nm by sputtering, for example, and an Si mask layer 18 is formed on the C mask layer 17 with a thickness of around 4 nm by sputtering. Next, a positive-type electron beam resist is spin-coated on the Si mask layer 18 to form a resin layer 19 (mask forming functional layer) with a thickness of around 130 nm. By doing so, as shown in FIG. 8, a preform 30 for manufacturing the magnetic disk 10 is completed. Next, as shown in FIG. 9, an electron beam EB is emitted onto the preform 30 using an electron beam lithography apparatus to draw an exposure pattern with the same planar shape as the concave/convex pattern 20s and the concave/convex pattern 20t on the resin layer 19. After this, by developing the resin layer 19 on which the drawing of the exposure pattern has been completed, as shown in FIG. 10, a concave/convex pattern 41 (resist pattern) is formed on the Si mask layer 18.

Figure 11:
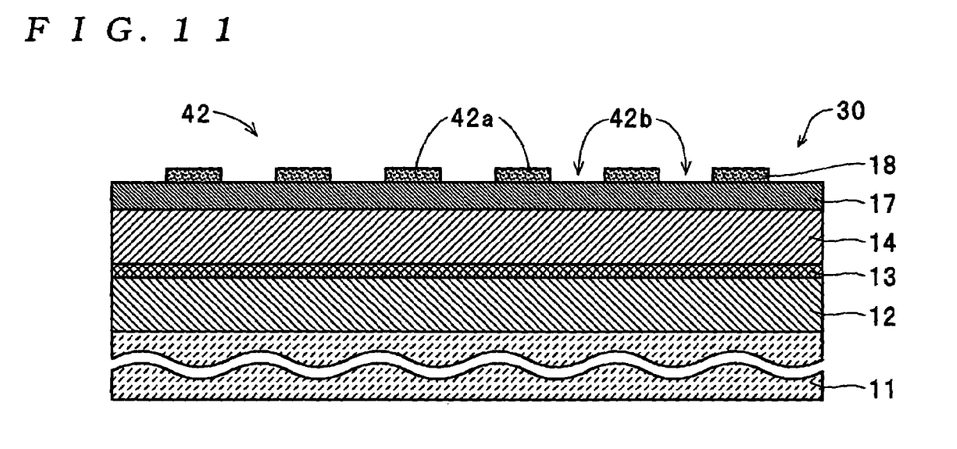
FIG. 11 is a cross-sectional view of the preform in a state where an Si mask layer has been etched with a concave/convex pattern as a mask to form a concave/convex pattern (Si mask) on a C mask layer.
Figure 12:
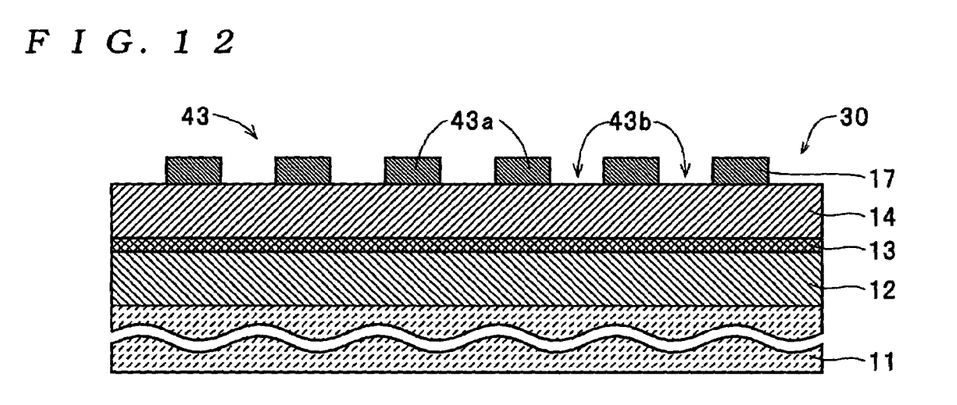
FIG. 12 is a cross-sectional view of the preform in a state where the C mask layer has been etched with the concave/convex pattern as a mask to form a concave/convex pattern (C mask) on a magnetic layer.
Figure 13:
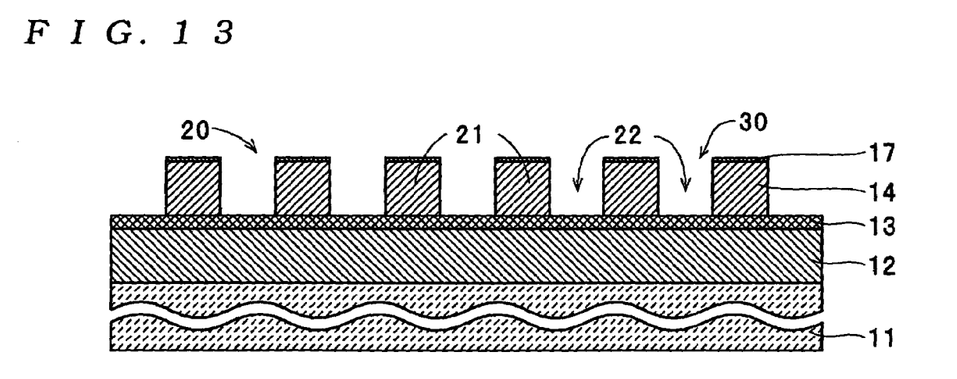
FIG. 13 is a cross-sectional view of the preform in a state where the magnetic layer has been etched with the concave/convex pattern as a mask to form a concave/convex pattern on an intermediate layer.

Next, by carrying out ion beam etching with argon (Ar) gas using the concave/convex pattern 41 (the resin layer 19) as a mask, the Si mask layer 18 exposed by the mask (convex parts 41a) at the bottoms of the concave parts 41b in the concave/convex pattern 41 is etched to form a concave/convex pattern 42 (Si mask pattern) in the Si mask layer 18 as shown in FIG. 11. After this, reactive ion etching is carried out with oxygen gas as the reactive gas and the concave/convex pattern 42 as a mask to etch the C mask layer 17 exposed from the mask (convex parts 42a) at the bottoms of the concave parts 42b in the concave/convex pattern 42 to form a concave/convex pattern 43 (C mask pattern) in the C mask layer 17 as shown in FIG. 12. Next, ion beam etching is carried out using argon (Ar) gas and the concave/convex pattern 43 as a mask. By doing so, as shown in FIG. 13, the positions in the magnetic layer 14 that were covered by the mask pattern (positions covered by convex parts 43a of the concave/convex pattern 43) become the convex parts 21 and positions exposed from the mask pattern (positions that were exposed at the bottoms of concave parts 43b of the concave/convex pattern 43) become the concave parts 22, thereby forming the concave/convex pattern 20 (the concave/convex patterns 20s and 20t) on the intermediate layer 13. Next, by carrying out reactive ion etching of the C mask layer 17 (the C mask pattern) remaining on the convex parts 21 with oxygen gas as the reactive gas, the upper surfaces of the convex parts 21 are exposed (the remaining C mask layer 17 is removed).

Next, while a bias power of around 150 W for example is applied to the preform 30, $SiO_2$ as the non-magnetic material 15 is sputtered with the pressure of the argon (Ar) gas set at 0.3 Pa, for example. At this time, a sufficient amount of the non-magnetic material 15 is sputtered to completely fill the concave parts 22 with the non-magnetic material 15 and form a layer of non-magnetic material 15 with a thickness of around 60 nm, for example, on the upper surfaces of the convex parts 21. Here, by sputtering the non-magnetic material 15 in a state where bias power is applied to the preform 30, a layer of non-magnetic material 15 is formed without producing large convexes and concaves on the surface. Next, ion beam etching is carried out on the layer of the non-magnetic material 15 on the magnetic layer 14 (on the convex parts 21, on the concave parts 22, and inside the concave parts 22) in a state where the pressure of the argon (Ar) gas is set at 0.04 Pa, for example, and where the incident angle of the ion beam on the surface of the preform 30 (the layer of the non-magnetic material 15) is set at 2°. At this time, the ion beam etching continues until the upper surfaces of the respective convex parts 21si in the inner periphery (the position that will later become the inner periphery region Ai) of the preform 30 are exposed from the non-magnetic material 15.

Here, on the magnetic disk 10 (the preform 30), the length L1i of the convex parts 21si in the inner periphery and the length L1o of the convex parts 21so in the outer periphery are formed at an equal length (in this example, 220 nm). Accordingly, by carrying out the ion beam etching process until the upper surfaces of the respective convex parts 21si are exposed in the inner periphery, the upper surfaces of the respective convex parts 21so in the outer periphery are also exposed (the upper surfaces of the convex parts 21si, 21so are exposed at substantially the same time). By doing so, the ion beam etching of the non-magnetic material 15 is completed and the surface of the preform 30 is made smooth. Next, after the protective layer 16 has been formed by forming a thin film of diamond-like carbon (DLC) by CVD so as to cover the surface of the preform 30, a fluoride lubricant is applied to the surface of the protective layer 16 so that the average thickness is around 2 nm, for example. By doing so, the magnetic disk 10 is completed as shown in FIG. 2.

On the magnetic disk 10, since the non-magnetic material 15 (residual) on the respective convex parts 21s is removed across the entire region of the magnetic disk 10 as described above, as shown in FIGS. 5 and 7, the difference in height between the concaves and convexes on the surface of the magnetic disk 10 (the difference in height Hi at the inner periphery and the difference in height Ho at the outer periphery) becomes substantially uniform across the entire region of the magnetic disk 10. More specifically, the degree of unevenness, that is, the surface roughness Ra of the surface of the magnetic disk 10 in the inner periphery region Ai is around 0.7 nm and the surface roughness Ra of the magnetic disk 10 in the outer periphery region Ao is around 0.8 nm. Accordingly, the flying height of the magnetic head 3 (the slider) becomes substantially constant across the entire region from the inner periphery of the magnetic disk 10 to the outer periphery, and therefore stabilized recording and reproducing become possible.

On the other hand, on the magnetic disk 10x manufactured according to the conventional method of manufacturing, the surface roughness Ra of the magnetic disk 10x in the inner periphery region Axi is around 0.7 nm in a state where the upper surface of the convex parts 21sxi are exposed from the non-magnetic material 15 in the inner periphery region Axi where the length L1xi along the direction of rotation is comparatively short. On the other hand, the surface roughness Ra of the magnetic disk 10x in the inner periphery region Axo where the length L1xo along the direction of rotation becomes longer than in the inner periphery region Axi in proportion to the distance from the center O of the concave/convex pattern 20t is around 3.1 nm due to the thickness of the residual on the convex parts 21sxo being thicker. In this case, when the non-magnetic material 15 is etched with etching conditions that expose the upper surfaces of the convex parts 21sxo from the non-magnetic material 15 in the outer periphery region Axo, the etching of the non-magnetic material 15 proceeds inside the concave parts 22sx across the entire range from the inner periphery of the magnetic disk 10x to the outer periphery, thereby causing deterioration in the smoothness of the magnetic disk 10x. In addition, when the non-magnetic material 15 is etched with the etching conditions described above, the convex parts 21sxi in the inner periphery region Axi are excessively etched, resulting in the risk of it being difficult to read a magnetic signal properly. For this reason, on the magnetic disk 10x manufactured according to the conventional method of manufacturing, it is difficult to make it possible to read the servo data Ds properly while making the flying height of the magnetic head 3 (slider) uniform across the entire region from the inner periphery of the magnetic disk 10x to the outer periphery.

In this way, according to the magnetic disk 10 and the hard disk drive 1, by forming the concave/convex pattern 20s (the servo pattern) by setting the unit convex part length and the unit concave part length so that the ratio of the unit convex part length to the unit concave part length decreases from the inner periphery to the outer periphery, compared to the conventional magnetic disk 10x where the concave/convex pattern is formed so that the ratio of the unit convex part length to the unit concave part length is equal across the entire range from the inner periphery to the outer periphery, the unit convex part length in the outer periphery can be sufficiently reduced. Accordingly, when a layer of the non-magnetic material 15 formed so as to cover the respective convex parts 21 is etched, it is possible to avoid the situation where there is a large difference between the thickness of the residual on the convex parts 21so in the outer periphery and the thickness of the residual on the convex parts 21si in the inner periphery. In addition, when the non-magnetic material 15 is etched so that the non-magnetic material 15 (residual) is not present on the respective convex parts 21s in the entire range from the inner periphery to the outer periphery, it is possible to remove the residual on the respective convex parts 21s without the risk of a situation where in the inner periphery, the convex parts 21s (magnetic material) themselves are etched together with the non-magnetic material 15. By doing so, it is possible to maintain favorable smoothness for the magnetic disk 10 across the entire range from the inner periphery to the outer periphery. Since it is possible to keep the flying height of the magnetic head 3 above the magnetic disk 10 substantially equal across the entire range from the inner periphery of the magnetic disk 10 to the outer periphery, the hard disk drive 1 can carry out recording and reproducing stably.

Also, according to the magnetic disk 10 and the hard disk drive 1, by forming the concave/convex pattern 20s (servo pattern) with the unit concave part length set so as to increase from the inner periphery to the outer periphery, unlike for example a structure where the unit concave part length is the same length across the entire range from the inner periphery to the outer periphery and the ratio of the unit convex part length to the unit concave part length decreases from the inner periphery to the outer periphery by changing the unit convex part length, it is possible to avoid a situation where the unit convex part length in the outer periphery is excessively short. Accordingly, it is possible to reliably avoid the occurrence of read errors for a magnetic signal read from the convex parts in the outer periphery.

In addition, according to the magnetic disk 10 and the hard disk drive 1, by forming the concave/convex pattern 20s (the servo pattern) by setting the unit convex part length at an equal length across the entire range from the inner periphery to the outer periphery, it is possible to keep the thickness of the residual (the non-magnetic material 15) formed on the convex parts 21s uniform across an entire range from the inner periphery to the outer periphery. Also, when the non-magnetic material 15 is etched so as to not leave residual on the respective convex parts 21si in the inner periphery, it is possible to avoid the situation where the convex parts 21so (the magnetic material) in the outer periphery are etched and the situation where residual is left on the convex parts 21so in the outer periphery, and when the non-magnetic material 15 is etched so as to not leave residual on the respective convex parts 21so in the outer periphery, it is possible to avoid the situation where the convex parts 21si (the magnetic material) in the inner periphery are etched and the situation where residual is left on the convex parts 21si in the inner periphery. Accordingly, it is possible to keep the smoothness of the magnetic disk 10 uniform across the entire range from the inner periphery to the outer periphery. As a result, the flying height of the magnetic head 3 above the magnetic disk 10 can be kept uniform across the entire range from the inner periphery to the outer periphery.

In addition, according to the magnetic disk 10 and the hard disk drive 1, the concave/convex pattern 20s (servo pattern) is formed with the combined length of the unit convex part length and the unit concave part length (that is, the formation pitch of the convex parts and the concave parts) set so as to increase from the inner periphery to the outer periphery in proportion to the distance from the center O of the concave/convex pattern 20t, so that the servo data can be reliably read (detected) from the servo pattern region As in the inner periphery and the servo pattern region As in the outer periphery without changing the frequency of the clock used as a reference for reading the servo data from the servo pattern region As. Since it is possible to carry out servo control with the same processing circuit as a servo signal processing circuit in an extremely common existing recording/reproducing apparatus, it is possible to reliably avoid increases in the manufacturing cost of the hard disk drive 1.

Next, another method of manufacturing the magnetic disk 10 will be described with reference to the drawings. It should be noted that detailed description of processes that are the same as in the method of manufacturing described above has been omitted.

Figure 14:
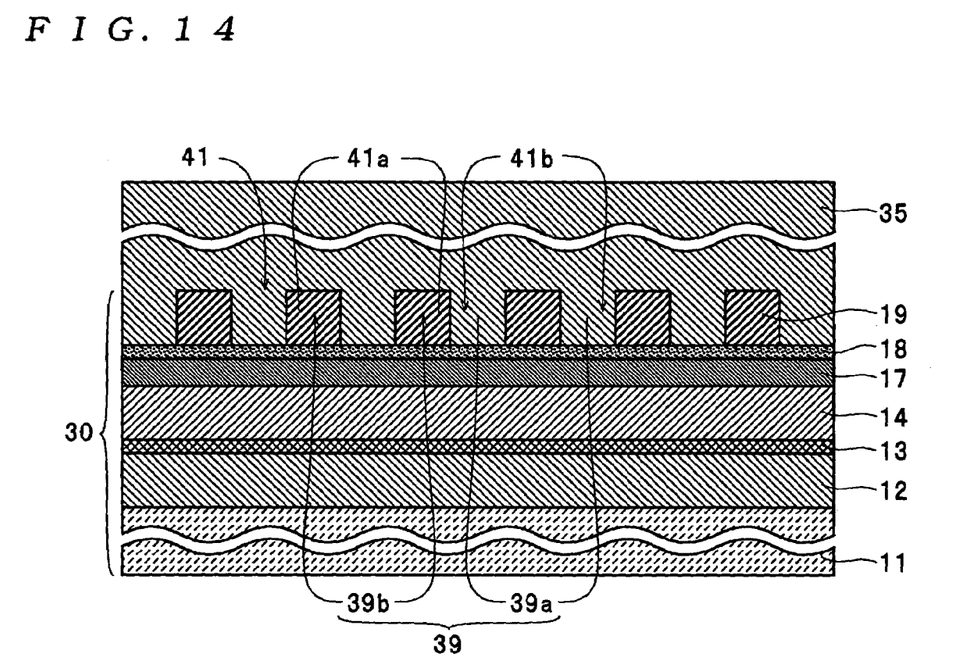
FIG. 14 is a cross-sectional view of the preform and the stamper in a state where the concave/convex pattern of the stamper has been pressed into the resin layer (the convex parts have been pressed into the resin layer)

Although in the method of manufacturing the magnetic disk 10 described above, a developing process is carried out after an exposure pattern has been drawn on the resin layer 19 of the preform 30 using an electron beam lithography apparatus to form the concave/convex pattern 41 (resist pattern) used as a mask for use during etching, the method of manufacturing an information recording medium according to the present invention is not limited to this. For example, it is possible to form the concave/convex pattern 41 in the resin layer 19 of the preform 30 by an imprinting method using a stamper 35 (see FIG. 14) as one example of a stamper according to the present invention. In this case, as shown in FIG. 14, a concave/convex pattern 39 where the positional relationship of the convexes and concaves is the reverse of the concave/convex pattern 20 (the concave/convex patterns 20t, 20s) of the magnetic disk 10 is formed in the stamper 35. It should be noted that the concave/convex pattern 39 of the stamper 35 is formed so that convex parts 39a correspond to the concave parts 22 in the concave/convex pattern 20 of the magnetic disk 10 and concave parts 39b correspond to the convex parts 21 of the concave/convex pattern 20. Accordingly, on the stamper 35, the length of the convex parts 39a along the direction of rotation is substantially equal to the length along the direction of rotation of the concave parts 22 in the concave/convex pattern 20, and the length of the concave parts 39b along the direction of rotation is substantially equal to the length along the direction of rotation of the convex parts 21 in the concave/convex pattern 20. It should be noted that there are no particular limitations regarding the method of manufacturing the stamper 35, and the stamper 35 can be manufactured according to a variety of known methods.

When the magnetic disk 10 is manufactured using the stamper 35, as shown in FIG. 14, first the concave/convex pattern 39 of the stamper 35 is transferred to the resin layer 19 of the preform 30 by imprinting. More specifically, by pressing the surface of the stamper 35 in which the concave/convex pattern 39 is formed into the resin layer 19 of the preform 30, the convex parts 39a of the concave/convex pattern 39 are pressed into the resin layer 19 of the preform 30. Next, the stamper 35 is separated from the preform 30 and resin (residual: not shown) remaining in the bottom surfaces are removed by an oxygen plasma process. By doing so, as shown in FIG. 10, the concave/convex pattern 41 is formed on the Si mask layer 18 of the preform 30. Next, by etching the Si mask layer 18 using the concave/convex pattern 41 as a mask, the concave/convex pattern 42 is formed on the C mask layer 17, and by etching the C mask layer 17 using the concave/convex pattern 42 as a mask, the concave/convex pattern 43 is formed on the magnetic layer 14. After this, the magnetic layer 14 is etched using the concave/convex pattern 43 as a mask to form the concave/convex pattern 20 on the intermediate layer 13. Next, after the non-magnetic material 15 has been sputtered in the same way as the method of manufacturing described above, ion beam etching is carried out on the layer of the non-magnetic material 15 to make the surface smooth. After this, the protective layer 16 is formed by forming a thin film of diamond-like carbon (DLC) using CVD and a fluoride lubricant is applied onto the surface of the protective layer 16. By doing so, as shown in FIG. 2, the magnetic disk 10 is completed.

In this way, according to the stamper 35 for manufacturing the magnetic disk 10, by forming the concave/convex pattern 39 with the convex parts 39a formed corresponding to the concave parts 22 in the concave/convex pattern 20 (the concave/convex patterns 20t, 20s) of the magnetic disk 10 and the concave parts 39b formed corresponding to the convex parts 21 in the concave/convex pattern 20 of the magnetic disk 10, unlike for example a method of manufacturing that forms the concave/convex pattern 41 by using an electron beam lithography apparatus to draw an exposure pattern with the same planar shape as the concave/convex patterns 20s, 20t in the resin layer 19 of the preform 30 and then developing the exposure pattern, it is possible to easily form the concave/convex pattern 41 in a short time by merely pressing the concave/convex pattern 39 of the stamper 35 into the resin layer 19. It is also possible to form the concave/convex pattern 41 in a large number of preforms 30 using a single stamper 35. Accordingly, the manufacturing cost of the magnetic disk 10 can be sufficiently reduced.

It should be noted that the present invention is not limited to the above structures. For example, although an example has been described where the concave/convex pattern 20s is formed so that the lengths (the lengths L1i, L1o) of the respective convex parts 21s along the direction of rotation are equal across the entire range from the inner periphery to the outer periphery, the concave/convex pattern 20s can be formed so that the lengths of the respective convex parts 21s slightly differ at positions from the inner periphery to the outer periphery. More specifically, it is possible to form the concave/convex pattern 20s so that the length of the convex parts 21so in the outer periphery is slightly longer than the length of the convex parts 21si in the inner periphery. Even with this structure where the lengths of the convex parts 21s differ, by forming the concave/convex pattern 20s with the unit convex part length set so that the length of the convex parts 21so in the outer periphery is shorter than the length L1xo of the convex parts 21sxo on the conventional magnetic disk 10x, it is possible to form the residual on the convex parts 21so in the outer periphery sufficiently thinly, and therefore favorable smoothness can be maintained in the outer periphery of the magnetic disk.

Figure 15:
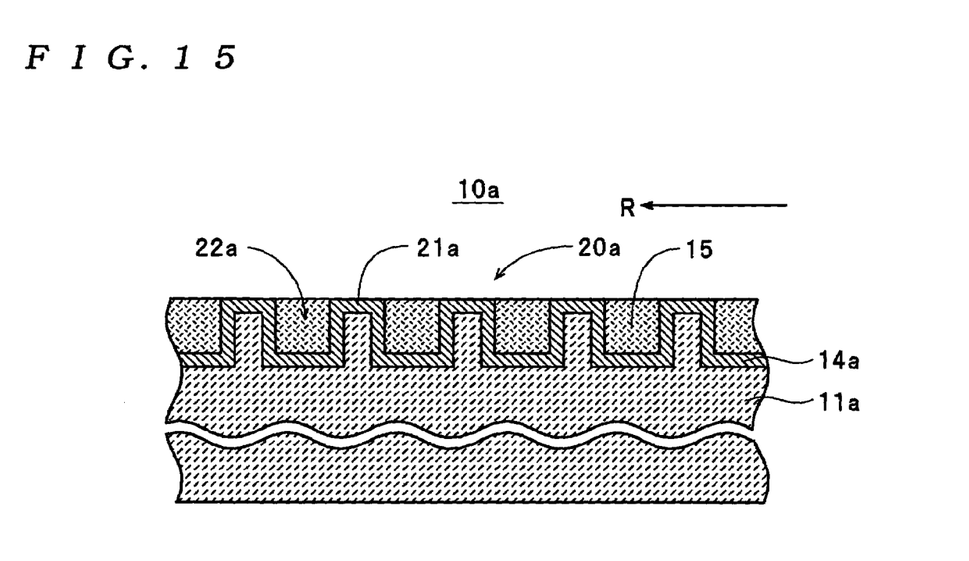
FIG. 15 is a cross-sectional view showing the multilayer structure of another magnetic disk.
Figure 16:
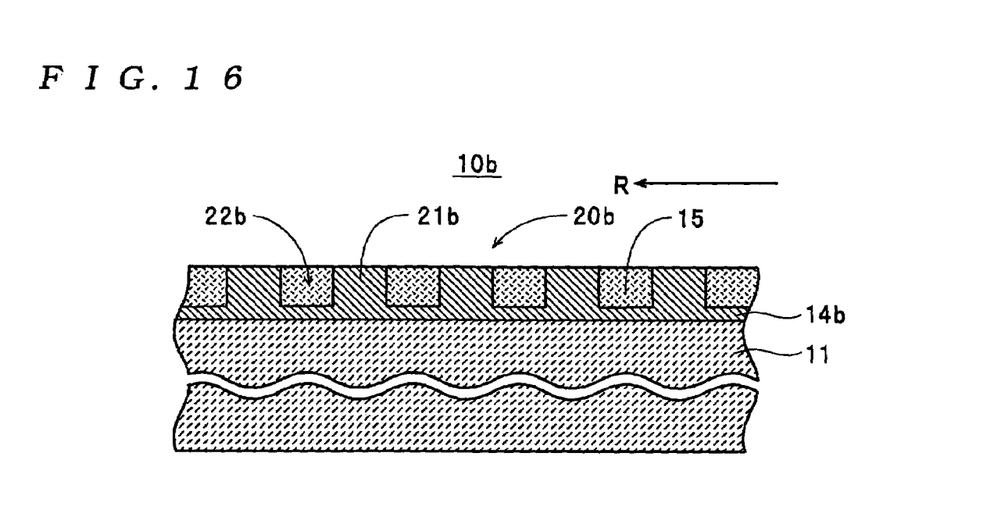
FIG. 16 is a cross-sectional view showing the multilayer structure of yet another magnetic disk.

In addition, the servo pattern of the present invention is not limited to the example described above, and it is possible to form the servo pattern by setting the unit convex unit length and the unit concave unit length so that the concave/convex form of the concave/convex pattern 20s in the servo pattern region As of the magnetic disk 10 is reversed and so that the various conditions for the present invention are satisfied. Also, although the respective convex parts 21 of the concave/convex pattern 20 are formed of magnetic material from the bottom ends to the top ends on the magnetic disk 10 described above, the present invention is not limited to this and by forming a magnetic layer 14a so as to cover a concave/convex pattern formed in the substrate 11a as in the magnetic disk 10a shown in FIG. 15, it is possible to construct the concave/convex pattern 20a with the convex parts 21a whose surfaces are formed by the magnetic layer 14a and the concave parts 22a whose bottom surfaces are also formed by the magnetic layer 14a. In this case, in the same way as the method of forming the concave/convex pattern 20 on the magnetic disk 10 described above, the concave/convex pattern of the substrate 11a can be formed by etching the substrate 11a using the concave/convex pattern 43 that was used as a mask when etching the magnetic layer 14, for example. Also, by press molding or injection molding using a stamper in the same way as the stamper 35, for example, it is possible to form a concave/convex pattern in the substrate 11a. In addition, in the same way as the magnetic disk 10b shown in FIG. 16, it is possible to construct a concave/convex pattern 20b of a continuous magnetic layer 14b that constructs the respective convex parts 21b and bottom surfaces of the concave parts 22b between the respective convex parts 21b. Also, although the magnetic disks 10, 10a, and 10b are magnetic disks for perpendicular recording, it is also possible to apply the present invention to magnetic disks for longitudinal recording.

What is claimed is:

1. An information recording medium where a data track pattern and a servo pattern composed of a concave/convex pattern including a plurality of convex parts are formed on at least one surface of a substrate and respective concave parts in the concave/convex pattern are filled with non-magnetic material, wherein in the concave/convex pattern that constructs the servo pattern, a unit convex part length along a direction of rotation of the substrate and a unit concave part length along the direction of rotation are set so that the ratio of the unit convex part length to the unit concave part length decreases from an inner periphery to an outer periphery of the information recording medium.

2. An information recording medium according to claim 1, wherein in the concave/convex pattern that constructs the servo pattern, the unit concave part length is set so as to increase from the inner periphery to the outer periphery.

3. An information recording medium according to claim 1, wherein in the concave/convex pattern that constructs the servo pattern, the unit convex part length is set at an equal or substantially equal length in an entire range from the inner periphery to the outer periphery.

4. An information recording medium according to claim 1, wherein respective convex parts in the concave/convex pattern that constructs the data track pattern are formed concentrically or in a spiral, and in the concave/convex pattern that constructs the servo pattern, the combined length of the unit convex part length and the unit concave part length is set so as to increase from the inner periphery to the outer periphery in proportion to a distance from a center of the data track pattern.

5. A recording/reproducing apparatus comprising an information recording medium according to claim 1 and a control unit that carries out servo control based on servo data corresponding to the servo pattern.

6. A stamper for manufacturing an information recording medium, on which is formed a concave/convex pattern including convex parts formed corresponding to concave parts in the concave/convex pattern of an information recording medium according to claim 1 and concave parts formed corresponding to convex parts in the concave/convex pattern of the information recording medium.

* * * * *